Patented Jan. 5, 1954

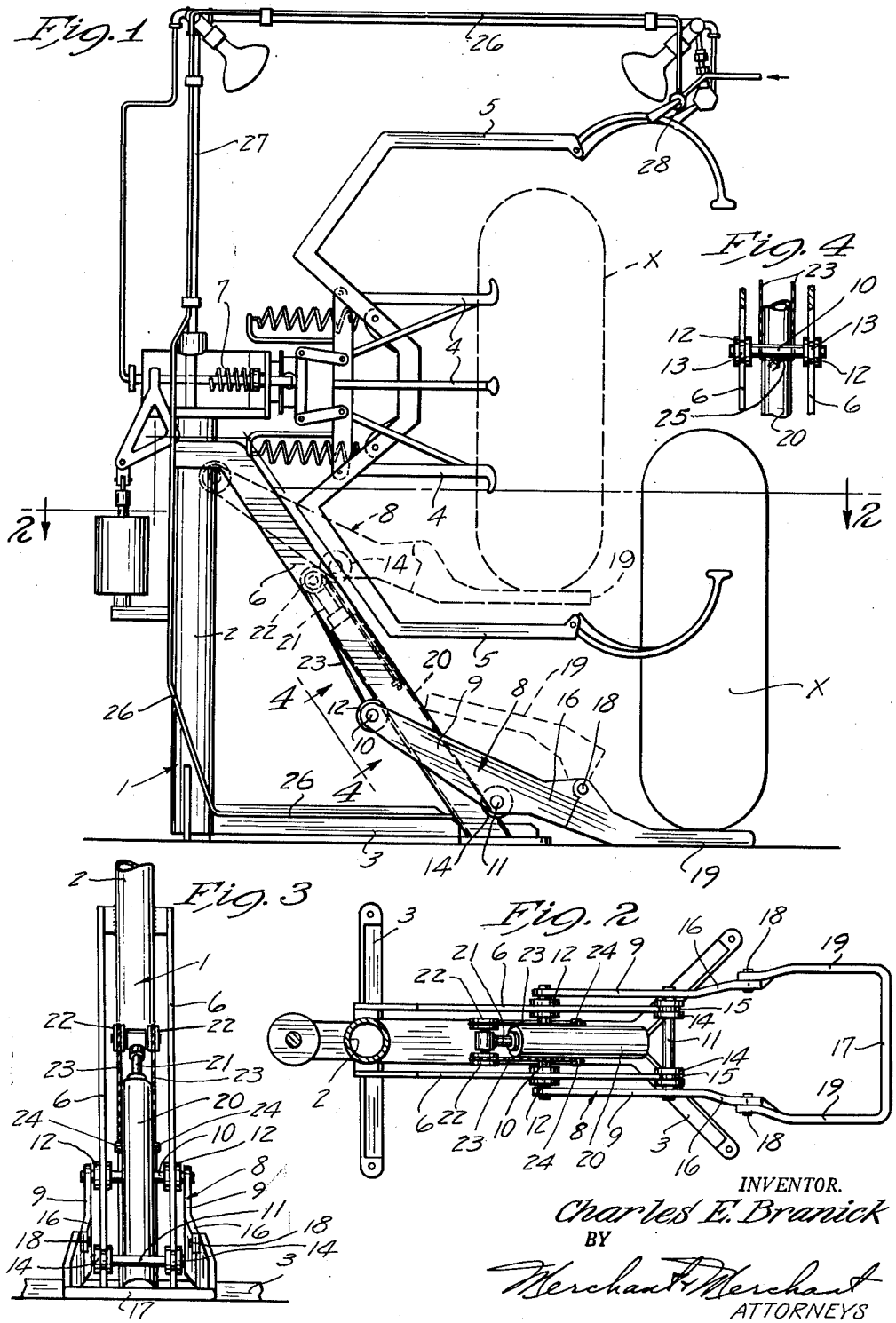

2,665,108

UNITED STATES PATENT OFFICE 2,665,108

COMBINATION TIRE SPREADER AND
TIRE-LIFTING HOIST THEREFOR

Charles E. Branick, Fargo, N. Dak.

Application May 2, 1951, Serial No. 224,171

3 Claims. (Cl. 254—50.3)

My invention relates to a combination tire spreader and tire-lifting hoist therefor.

In tire spreaders of the type disclosed and claimed in my Patent No. 1,943,784, wherein the tire-spreading arms are in vertically-spaced relation to the ground, it is frequently difficult, if not impossible, for one person to lift a given tire into engagement with the tire spreader arms. It is the object of my invention to provide novel means whereby heavy tires may be quickly and easily elevated by power-driven hoist means from the floor to an operative position upon the tire spreader arms.

A further object of my invention is the provision of a novel hoist for spreaders of the type above-identified, portions of said hoist imparting great rigidity to said spreader.

Another object of my invention is the provision of a hoist of the type described which has a tire-receiving cradle normally resting on the floor forwardly of the lifting arms and which will simultaneously elevate a tire and move the same rearwardly in a straight line to a position on the lifting arms.

A still further object of my invention is the provision of a device of the class described which is rugged in construction, relatively inexpensive to build, and which has a minimum of working parts.

A still further object of my invention is the provision of a device of the class described, wherein a tire-lifting cradle normally positioned on the floor forwardly of the tire spreader arms may be easily and quickly retracted into an inoperative position, so as to leave such floor space clear for the feet of the operator without elevation of the hoist.

The above and still further objects of my invention will become apparent from the following detailed specification, appended claims, and attached drawings.

Referring to the drawings, wherein like characters indicate like parts throughout the several views:

Fig. 1 is a view in side elevation of my novel device;

Fig. 2 is a view, partly in section and partly in plan, taken on the line 2—2 of Fig. 1;

Fig. 3 is a view, taken from left to right with respect to Fig. 1, some parts removed; and Fig. 4 is a fragmentary section, taken on the line 4—4 of Fig. 1.

Referring with greater particularity to the drawings, the numeral 1 indicates, in its entirety, a frame having a vertically disposed support 2 and a base 3 which is rigidly secured to the support 2 and projects forwardly therefrom so as to underlie the tire spreader arms 4 and 5. The tire spreader arms 4 are of the type adapted to be inserted into the inside of a tire casing; whereas the spreader arms 5 are adapted to extend around the outside of the tire casing at substantially-spaced points, all as more particularly described in my above-identified patent. Means for imparting desired spreading movements to the arms 4 and 5 form no part of the instant invention and hence will not be described in detail here.

My novel tire-lifting attachment comprises a pair of parallel inclined rails 6 rigidly secured at their lower ends to the base 3 in laterally-spaced relation to the upright support 2 and rigidly secured at their upper ends to opposite sides of the vertical support 2, preferably and as shown immediately below the head 7 in which the arms 4 and 5 are rotatably mounted. It will be seen that the axis of rotation of the arms 4 and 5 and the rails 6 are in substantially the same vertical plane. Rails 6 obviously impart great rigidity to the support 2 and base 3. A carriage 8 is mounted for longitudinal movements on said rails 6. Said carriage includes laterally-spaced frame members 9 and transverse connecting members 10 and 11, one adjacent each end thereof. As shown, the transverse member 10 underlies the rails 6 and journals for rotation thereon a pair of rollers 12, each of which has a peripheral endless slot 13 adapted to receive therein an adjacent lower edge of rail 6. The transverse member 11 overlies the rails 6 and likewise journals a pair of laterally-spaced rollers 14 which are slotted, as at 15, to receive one each an upper edge of said rail 6.

Projecting forwardly from the frame members 9 of the carriage 8 are a pair of tire-lifting arms 16, formed integrally with frame members 9, extend forwardly and downwardly and are joined at their forward ends, as indicated at 17. Preferably and as shown, the arms 16 are hinged as at 18 to permit only upward swinging movements to the dotted line position of Fig. 1. Likewise, it is desirable to form the arms 16 with horizontally-disposed portions 19 adjacent their forward ends. These portions 19, as shown by the full line position of Fig. 1, lie flat upon the ground when the carriage 8 is moved to its lowermost position, so as to facilitate placing a tire casing X thereon and removing same therefrom, merely by rolling action. It will be noted that the spaced elements 19 and the connecting elements 17 form a U-shaped cradle for the reception of a tire casing X, the spaced elements 19 positively checking rotation of said tire casing while the same is in an elevated position.

Means for imparting movements to the carriage 8 and the lifting arms 16 comprises a cylinder 20 intermediate the rail 6 and in substantially parallel relationship thereto. The bottom of the cylinder 20 preferably rests upon the base 3 and is rigidly secured thereto; whereas a rod 21 connected to a piston not shown within the cylinder 20 projects out the upper end thereof. Journaled to the free end of the connecting rod 21 is a pair of grooved rollers 22. A pair of cables 23 run over the grooved rollers 22 and each thereof has one end rigidly connected to the exterior of the piston 20, as indicated at 24. The opposite ends of the cables 23 are rigidly secured to the carriage 8, as indicated at 25. Fluid under pressure is introduced into the cylinder 20 and removed therefrom through the medium of a tubular connection 26 from a source not shown. As shown, tube 26 is secured to the upright support 2 and to an L-shaped extension thereof 27, the free end of which terminates in a position overlying the spreader arms 4 and 5, where a manually-controlled readily accessible valve 28 is interposed.

When it is desired to elevate a tire casing X onto the spreader arms 4, the same is rolled onto the U-shaped cradle 17—19, as illustrated by the full lines in Fig. 1. Thereafter, fluid under pressure is introduced into the cylinder 20 through the medium of the valve 28. As the piston-equipped connecting rod 21 is forced outwardly of the free end of the cylinder 20, the carriage 8 and associated parts will be elevated to the dotted line position of Fig. 1. The tire X, thus elevated from the full line position to the dotted line position in a straight line, minimizes the balancing and handling of the casing X during movement. Lowering movements are imparted to the carriage 8 and associated parts, merely by turning the valve 28 to a position to allow the fluid within the cylinder 20 to escape. Thereafter, said carriage 8 and associated parts return to the full line position under the action of gravity.

While I have described a preferred embodiment of my invention, it should be obvious that the same is capable of modification without departure from the spirit and scope of the invention as defined in the appended claims.

What I claim is:

1. In a device of the class described, a base, a vertically-disposed support on said base, a plurality of spreader arms carried by said support in spaced relation to the ground, said base underlying said spreader arms, an inclined rail below said spreader arms extending between said base and the intermediate portion of said support, a carriage, means mounting said carriage for movements longitudinally of said rail, a tire-lifting arm extending outwardly of said carriage for common movements therewith, and means for imparting movements to said carriage and tire-lifting arm, the free end of said lifting arm projecting forwardly of said spreader arms when said lifting arm is in its lowermost position.

2. In a device of the class described, a vertically-disposed support, said support being provided with a foot-like base which projects forwardly therefrom, a plurality of spreader arms carried by said support in spaced relation to the ground and overlying said base, a pair of laterally-spaced parallel inclined rails below said spreader arms extending between an outwardly-disposed portion thereof and an intermediate portion of said support, a carriage, vertically-spaced pairs of rollers on said carriage, one pair each of said rollers engaging opposite side edges of said rails and mounting said carriage for longitudinal movements with respect to said rails, a generally U-shaped tire-lifting arm projecting forwardly from said carriage and terminating in a horizontally-disposed portion engageable with the ground when said carriage is moved to its lowermost position on said rails, a fluid pressure-operated cylinder and piston between said rails and extending generally parallel thereto, said piston being provided with a rod which projects outwardly from the upper end of said cylinder, a roller on the free end of said piston rod, and a cable extending over said roller, one end of said cable being secured to said carriage and the other end of said cable being relatively fixed with respect to said carriage.

3. The structure defined in claim 1 in which said tire-lifting arm is provided with a hinge at its intermediate portion which permits swinging movements of its free end only in an upward direction.

CHARLES E. BRANICK.

References Cited in the file of this patent

UNITED STATES PATENTS

| Number | Name | Date |
|---|---|---|
| 1,306,430 | Klemme | June 10, 1919 |
| 2,375,595 | Stoehr | May 8, 1945 |
| 2,477,858 | Brabbin | Aug. 2, 1949 |
| 2,525,983 | Wenigar | Oct. 17, 1950 |